US005200764A

United States Patent [19]

Nagasawa

[11] Patent Number: 5,200,764

[45] Date of Patent: Apr. 6, 1993

[54] PRINT HEAD ASSEMBLY FOR USE IN AN ULTRASONIC PRINTER

[75] Inventor: Hideo Nagasawa, Oiso, Japan

[73] Assignee: NCR Corporation, Dayton, Ohio

[21] Appl. No.: 902,431

[22] Filed: Jun. 18, 1992

Related U.S. Application Data

[63] Continuation of Ser. No. 633,905, Dec. 26, 1990, abandoned.

[30] Foreign Application Priority Data

Dec. 27, 1989 [JP] Japan .................................. 1-336792
May 22, 1990 [JP] Japan .................................. 2-130293

[51] Int. Cl.[5] .......................... G01D 15/10; B41J 2/25

[52] U.S. Cl. ................................ 346/105; 346/76 R; 400/121; 400/124

[58] Field of Search ............. 346/76 R, 105; 400/121, 400/124, 166; 101/93.03, 93.04, 93.05; 310/328, 348

[56] References Cited

U.S. PATENT DOCUMENTS 4,046,073 9/1977 Mitchell et al. ...................... 101/426
4,781,477 11/1988 Nagasawa ........................... 400/124
4,787,760 11/1988 Nagasawa ........................... 400/124
4,908,631 3/1990 DeBoer et al. ................... 346/76 R

OTHER PUBLICATIONS

Edward Eisner, "Design of Sonic Amplitude Transformers for High Magnification", *The Journal of the Acoustical Society of America,* vol. 35, No. 9, Sep. 1963, pp. 1367–1377.

*Primary Examiner*—Benjamin R. Fuller
*Assistant Examiner*—Eric Frahm
*Attorney, Agent, or Firm*—Craig E. Miller; Matthew R. Jenkins

[57] ABSTRACT

The present invention relates to a print head assembly for use in an ultrasonic printer. The print head assembly comprises at least one print head which is slidably mounted in a block which is slidably secured in the ultrasonic printer. Each print head comprises an ultrasonic vibrator, a horn coupled to the ultrasonic vibrator for amplifying energy generated by the ultrasonic vibrator, and a print head wire coupled to the horn. The print head wire has a tip which forces an ink ribbon into engagement with a print medium and against a platen in the ultrasonic printer in order to print a pixel thereon. A pressurizing mechanism contacts the block and forces the tip of the at least one print head against the ink ribbon and the print medium and against the platen with a predetermined force in order to print at least one pixel on the print medium.

25 Claims, 4 Drawing Sheets

FIG. 6

| Z POSITION (mm) | RADIUS (mm) |
|---|---|
| 0.0 | 0.35 |
| 0.69476 | 0.3510065 |
| 1.38992 | 0.3539714 |
| 2.08507 | 0.3589765 |
| 2.77984 | 0.3661576 |
| 3.47499 | 0.3756237 |
| 4.17015 | 0.3875923 |
| 4.86491 | 0.4023354 |
| 5.56007 | 0.4201523 |
| 6.25483 | 0.4414782 |
| 6.94999 | 0.4668027 |
| 7.64514 | 0.4968058 |
| 8.33991 | 0.5322492 |
| 9.03506 | 0.5741121 |

| Z POSITION (mm) | RADIUS (mm) |
|---|---|
| 9.73022 | 0.6235914 |
| 10.42498 | 0.6821559 |
| 11.12014 | 0.7515194 |
| 11.81529 | 0.8338035 |
| 12.51006 | 0.9314292 |
| 13.20521 | 1.047035 |
| 13.89997 | 1.183232 |
| 14.59513 | 1.341979 |
| 15.29029 | 1.523685 |
| 15.98503 | 1.725655 |
| 16.6802 | 1.940491 |
| 17.37536 | 2.1553 |
| 18.070123 | 2.353218 |
| 18.765279 | 2.517976 |

| Z POSITION (mm) | RADIUS (mm) |
|---|---|
| 19.460042 | 2.639566 |
| 20.155198 | 2.717145 |
| 20.850353 | 2.757702 |
| 21.545116 | 2.771928 |
| 22.240272 | 2.770323 |
| 22.935428 | 2.761102 |
| 23.630191 | 2.749759 |
| 24.325347 | 2.739368 |
| 25.02011 | 2.731289 |
| 25.715265 | 2.72574 |
| 28.410421 | 2.722367 |
| 27.105184 | 2.720654 |
| 27.80024 | 2.720137 |

PRINT HEAD ASSEMBLY FOR USE IN AN ULTRASONIC PRINTER

This is a continuation of co-pending application Ser. No. 07/633,905 filed on Dec. 26, 1990 now abandoned.

BACKGROUND OF THE INVENTION

1. Field of the Invention

The present invention relates to a print head assembly for use in an ultrasonic printer, and more particularly, the present invention relates to a print head assembly having means for automatically adjusting the force with which a print head wire impacts an ink ribbon against a print medium.

2. Description of Related Art

Ultrasonic printers of the prior art typically have one or more print head wires which have a tip or end which forces an ink ribbon into contact with the surface of a document or print medium by a pressurizing force even when no printing operation is performed. The density of the pixels printed on the print medium in these ultrasonic printers was controlled by adjusting the force with which the tip impacts the ink ribbon against the print medium. The pressurizing force or pressure with which the tip forces the ink ribbon against the print medium was typically adjusted at the final stage of the manufacturing process of the printer. The pressurizing force was fixed and not adjustable after the printer was shipped from the place where it was manufactured.

The pressurizing force was usually adjusted by repeating several print tests and then manually adjusting the print head wire to a fixed position so that the tip of the wire presses the ink ribbon against the surface of the print medium with the desired pressurizing force. Where a print head had multiple print head wires, the procedure for manually adjusting the individual print head wires so that a uniform force is applied by each print head wire was difficult.

In some ultrasonic printers of the prior art, the print density may be varied by controlling the amount of electric energy input to an ultrasonic vibrator which is coupled to the print head wire by a horn or like amplitude amplifier. The ultrasonic vibrator causes the print head wire to vibrate. Japanese Laid Open Patent Specification No. 144055/88 discloses a method of controlling the amount of electric energy input to the ultrasonic vibrator. FIG. 3 shows a timing diagram for the ultrasonic vibrator in the above-referenced Japanese Specification. As shown in FIG. 3, when the voltage Vs input into the ultrasonic vibrator is varied, the frequency fc at which the tip of the printhead wire vibrates will also vary. As the frequency fc varies, the ultrasonic vibrator causes the vibration of the print head wire to vary in direct proportion which in turn causes a variation in the density of the print. This method of controlling the amount of electric energy input to the ultrasonic vibrator in order to adjust the print density has the following drawbacks:

(1) In the ultrasonic printer, the print density is not necessarily directly proportional to the voltage applied across the ultrasonic vibrator, and the degree of print density which can be varied by controlling the amount of electric energy is extremely small.

(2) Where the voltage pulse width is varied in order to vary the print density, the printing speed is slowed down and the end of the print head wire resonates randomly which deteriorates the quality of print.

(3) Where a multi-head wire is used, the pressurizing force of individual print head wires may be different from one another. Consequently, varying the applied voltage or pulse width to adjust the pressurizing force for one print head wire may not be suitable for adjusting the pressurizing force for other wires of the print head.

Another problem with ultrasonic printers of the prior art is that they utilize a stepped horn for transmitting energy from the vibrator to a print wire. The stepped horns do not effectively transmit energy from the vibrator because they lose energy at each step in the horn.

SUMMARY OF THE INVENTION

The invention of the present application has been contemplated in order to solve the above mentioned problems associated with the prior art.

In one aspect of the invention, there is provided a print head assembly for use in an ultrasonic printer having a platen therein, said print head assembly comprising: at least one print head; an ultrasonic vibrator; a horn coupled to the ultrasonic vibrator for amplifying energy generated by the ultrasonic vibrator; a print head wire coupled to the horn, said print head wire having a tip which forces an ink ribbon into engagement with a print medium and against the platen in order to print a pixel on the print medium upon generation of energy by the ultrasonic vibrator; a block for slidably holding at least one print head; and a pressurizing mechanism contacting the block, said pressurizing mechanism being capable of forcing the tip of the print head wire against the ink ribbon and the print medium and against the platen with a predetermined force in order to print at least one pixel on the print medium.

An advantage of the present invention is that the inventive structure reduces or eliminates the amount of manual adjustment required.

Another advantage of this invention is that the range of fluctuation of the pressurizing force and the print density can be controlled.

Yet another advantage of this invention is that the inventive structure can accommodate various thicknesses of print media. In particular, printing on paper media consisting of several sheets of carbon paper, for example, can be realized.

Another advantage of this invention is that the inventive structure provides a print head assembly having means for adjusting the pressure or force with which one or more print head wires impact the print medium.

Still another advantage of this invention is that the inventive structure provides a non-stepped horn which facilitates transmitting energy from an ultrasonic vibrator to a print head wire.

With these and other advantages, which will become apparent from the following description, the present invention includes certain novel features of construction and combinations of parts, and a preferred form or embodiment of the invention is hereinafter described with reference to the drawings which accompany and form a part of this specification.

BRIEF DESCRIPTION OF THE DRAWINGS

FIG. 6 shows a table of data relative to the horn shown in FIG. 5, and showing a radius of the horn at various "Z-positions" along the horn.

DESCRIPTION OF THE PREFERRED EMBODIMENT

Figure 1:
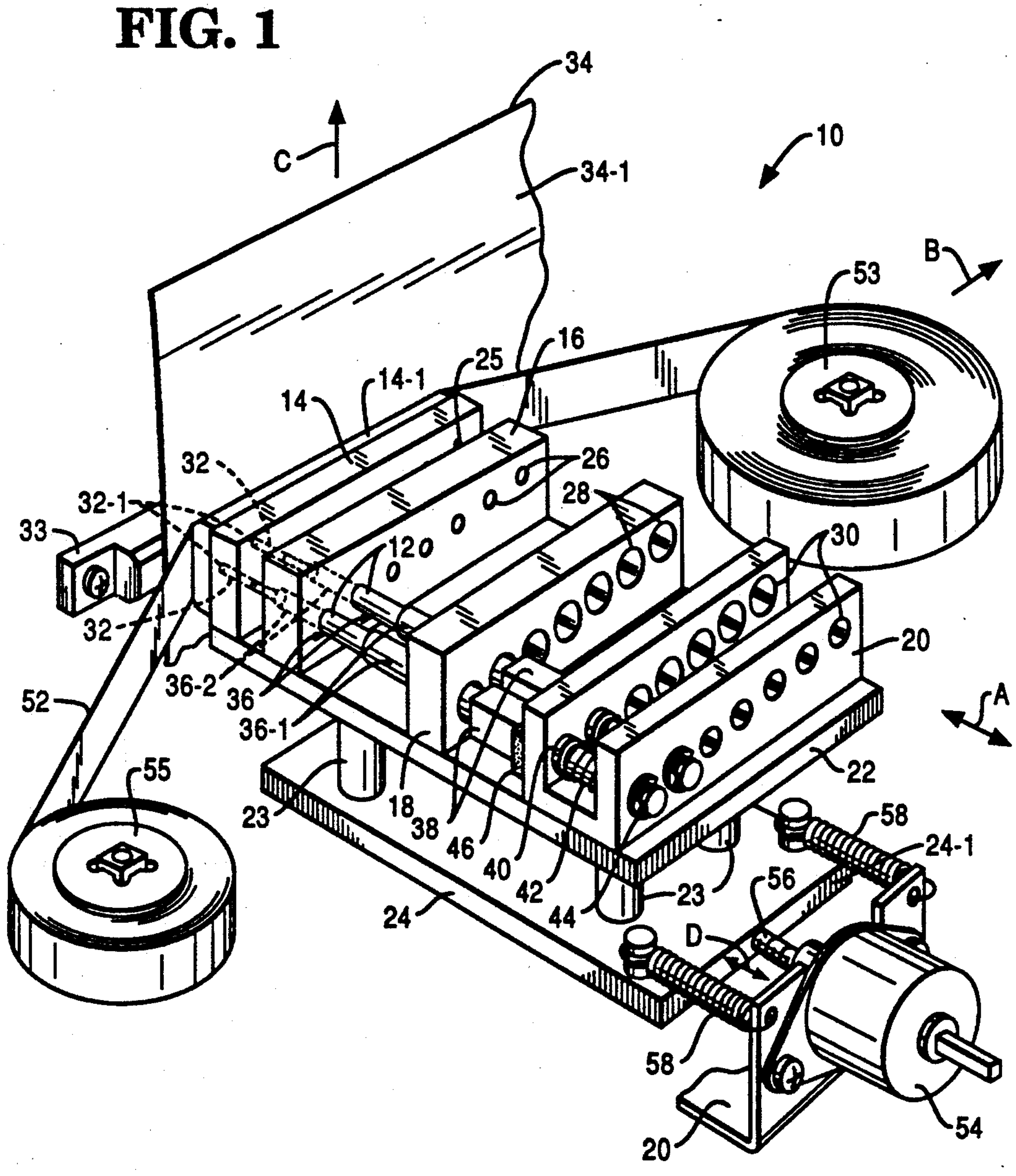
FIG. 1 is a perspective view of a print head assembly used in an ultrasonic printer and incorporating the structure of the present invention.

An embodiment of a print head assembly 10 for use in an ultrasonic printer according to the present invention will be described with reference to FIG. 1. The print head assembly 10 comprises a plurality of print heads 12, a wire guide block 14, a stopper block 16, a horn guide block 18 and a U-shaped compression block 20, which blocks are secured or formed on a housing plate 22. The housing plate 22 is mounted on a base plate 24 using suitable fasteners, such as screws (not shown), and spacers 23. The base plate 24 is attached to a carriage (not shown) through a linear slide bearing (not shown) so that the print head assembly 10 and the base plate 24 can move towards and away from a document or print medium 34 in the direction of double arrow A in FIG. 1. In a preferred embodiment, the carriage (not shown) traverses across a face or surface 34-1 of the print medium 34 in the direction of arrow B in FIG. 1 in order to print lines of pixels (not shown) on the print medium 34. As best illustrated in FIG. 1, the blocks 14, 16, 18, and 20 have apertures 25, 26, 28 and 30, respectively, which are formed therein in order to permit the print heads 12 to be slidably mounted in the apertures.

Figure 4:
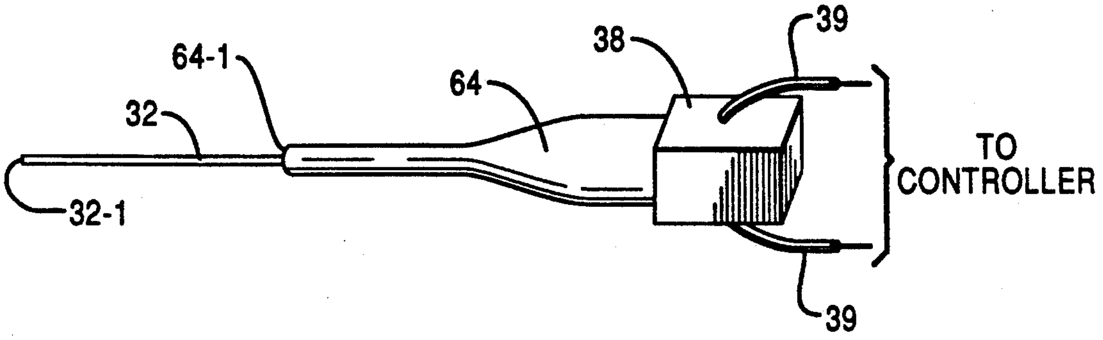
FIG. 4 is a perspective view of a print head having a non-stepped horn.

Each print head 12 has a print head wire 32 formed with a tip or end 32-1. Each print head 12 also includes an amplitude amplifier or stepped horn 36 which has one end coupled to the print head wire 32 and the other end coupled to a vibrator 38. The vibrator 38 is connected to a controller (not shown) in the ultrasonic printer (not shown) by suitable conductors 39 (FIG. 4). The vibrator 38 causes the end 32-1 of the print head wire 32 to vibrate. The vibrator 38 also comprises a compression shaft 40 which is slidably mounted in the compression block 20. The compression shaft 40 has a coiled spring 42 therearound and is secured to the compression block 20 with an E-ring 44. A rubber member 46 lies between the vibrator 38 and the compression block 20, as illustrated in FIG. 1. The vibrator 38 converts electric energy to mechanical vibrating energy and the stepped horn 36 collects and amplifies the energy generated from the vibrator 38. The stepped horn 36 amplifies the vibration of the print head wire 32 at the end 32-1. The end 32-1 of the print head wire 32 transmits the vibrating energy to an ink holding medium or an ink ribbon 52. The ink ribbon 52 has a polyethylene terephthalate or PET film of 6 micrometers as the base. In the embodiment being described, the ink ribbon 52 includes an ink (not shown) having a melting point of about 70 degrees centigrade and a viscosity of 120 CPS (100 degrees centigrade). The end 32-1 of each print head wire 32 cooperates with a platen 33 (FIG. 1) to cause a line or plurality of pixels (not shown) to be printed on the print medium 34.

Figure 5:
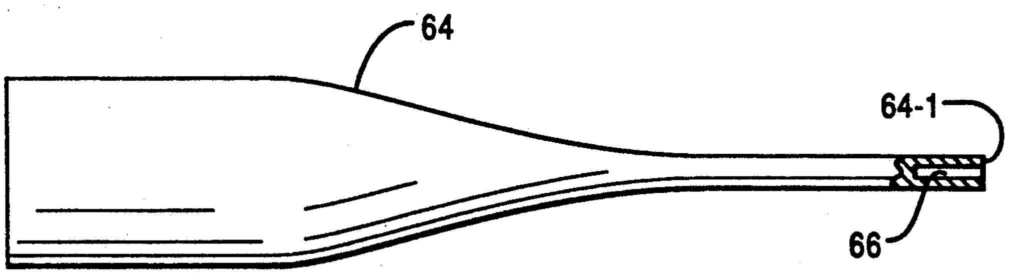
FIG. 5 is a side view, partly in section, of the non-stepped horn shown in FIG. 4.

Although the print heads 12 shown in FIG. 1 have stepped horns 36, FIGS. 4 and 5 show a streamlined and non-stepped shaped horn 64 which may be used in the print head assembly 10. The shape of the shaped horn 64 may be expressed by the Fourier Transform Series in order to maximize the amount of vibration provided by the vibrator 38 to the end 32-1 of the print head wire 32. The shape of the shaped horn 64 minimizes the amount of energy lost at each step of the stepped horn 36 shown in FIG. 1. Because the shaped horn 64 transmits energy from the vibrator 38 to the print head wire 32 more efficiently than the stepped horn 36, a print head wire 32 for the shaped horn 64 is shorter in length than a print head wire 32 used with the stepped horn 36. The shorter print head wire 32 enables the overall length of the print heads 12 to be reduced.

FIG. 6 provides a table of some typical dimensions for the shape of the shaped horn 64 (FIG. 5) at various distances or positions (each hereinafter referred to as a "Z-position") from an end 64-1 of the shaped horn 64. For example, at the Z-position of 0.0 mm the radius of the shaped horn 64 is 0.35 mm, whereas at a Z-position of 4.17015 mm from the end 64-1, the radius of the shaped horn 64 is 0.3875923 mm. The end 64-1 has an aperture 66 having a typical diameter of 0.36 mm for receiving the print head wire 32 which has a diameter of 0.35 mm in a preferred embodiment. The shaped horn 64 is made of a SUS 316 stainless steel material, but it could be made from other suitable materials, such as duralumin-titanium. In a preferred embodiment, the print head wire 32 extends from the end 64-1 approximately half of a wavelength (not shown) of the resonance frequency (not shown) of the material of which the shaped horn 64 is made, but it could be shorter or longer if desired. The print head wire 32 is preferably made from a KHA-30 high speed, powdered metal material, manufactured by Kobe Seiko K. K. of Japan. Although not shown, the print head wire 32 could be integrally formed as a part of the shaped horn 64 to provide a one-piece construction which would not require soldering or the like. Also, the end 32-1 of the print head wire 32 could have a cross-sectional shape (not shown) which is square, rectangular, or any other desired configuration, depending on the desired shape of the printed pixel.

The ink ribbon 52 (FIG. 1) is provided from a wind-out spool 53 to a wind-up spool 55. In a preferred embodiment, the spools 53 and 55 are constructed and secured to the carriage (not shown) in the printing apparatus (not shown). A slip clutch (not shown) is used to advance or wind the ink ribbon 52 in a counterclockwise direction (as viewed in FIG. 1) onto the take-up spool 55 as the carriage moves in the direction of arrow B so that there is no difference in the relative speed between the print medium 34 and the ink ribbon 52 as the carriage moves across the surface 34-1 of the print medium 34.

The wire guide block 14 has a ribbon guide member 14-1 which facilitates guiding the ink ribbon 52 in front of the end 32-1 of each print head wire 32. In the embodiment being described, the ends 32-1 protrude from the wire guide block 14 into the ribbon guide member 14-1 approximately 0.5 mm. The end 32-1 of each print head wire 32 slides along the surface of the ink ribbon 52. An energizing signal (not shown) is applied by the controller (not shown) to the vibrator 38 which causes the end 32-1 to vibrate. As the print head wire 32 vibrates, the end 32-1 heats the ink ribbon 52 in order to "burn" or print the pixel (not shown) onto the print medium 34.

The coiled spring 42 exerts a dampening pressure load on the vibrator 38 of the print head 12 in order to bias the print heads 12 towards the print medium 34 with a uniform force. The amount of force used to bias the print heads 12 can be adjusted by changing the position where the compression block 20 is mounted on the housing plate 22.

The wire guide block 14 guides each print head wire 32 toward the print medium 34. The aperture 28 in the horn guide block 18 is larger in diameter than the outer diameter of a portion 36-1 (shown solid in FIG. 1) of the stepped horn 36 to permit the print heads 12 to slide in the horn guide block 18. The aperture 26 in the stopper block 16 is larger than the print head wire 32 but smaller in diameter than a second portion 36-2 (shown in phantom in FIG. 1) of the stepped horn 36. This enables the stopper block 16 to stop the print heads 12 from being forced in the direction toward the print medium 34 beyond a predetermined distance (not shown).

A stepping motor 54 (FIG. 1) is used as a linear actuator to rotate an internal motor (not shown) in response to a control signal (not shown) from the controller (not shown) to change the length of a shaft 56 of the stepping motor 54. The shaft 56 is always in contact with an end face 24-1 of the base plate 24, so that the motion of the shaft 56 of the stepping motor 54 is directly transmitted to both the housing plate 22 and the base plate 24. A pair of springs 58 bias the shaft 56 against the base plate 24. In the embodiment shown in FIG. 1, the stepping motor 54 is used as a mechanism for adjusting the pressure with which the end 32-1 of the print head wire 32 forces the ink ribbon 52 to engage with the print medium 34. This adjustment permits the print head assembly 10 to cause the end 32-1 of each print head wire 32 to force the ink ribbon 52 against the print medium 34 by a predetermined amount of pressure. This adjustment is typically performed when the printing apparatus (not shown) is not printing.

Figure 2:
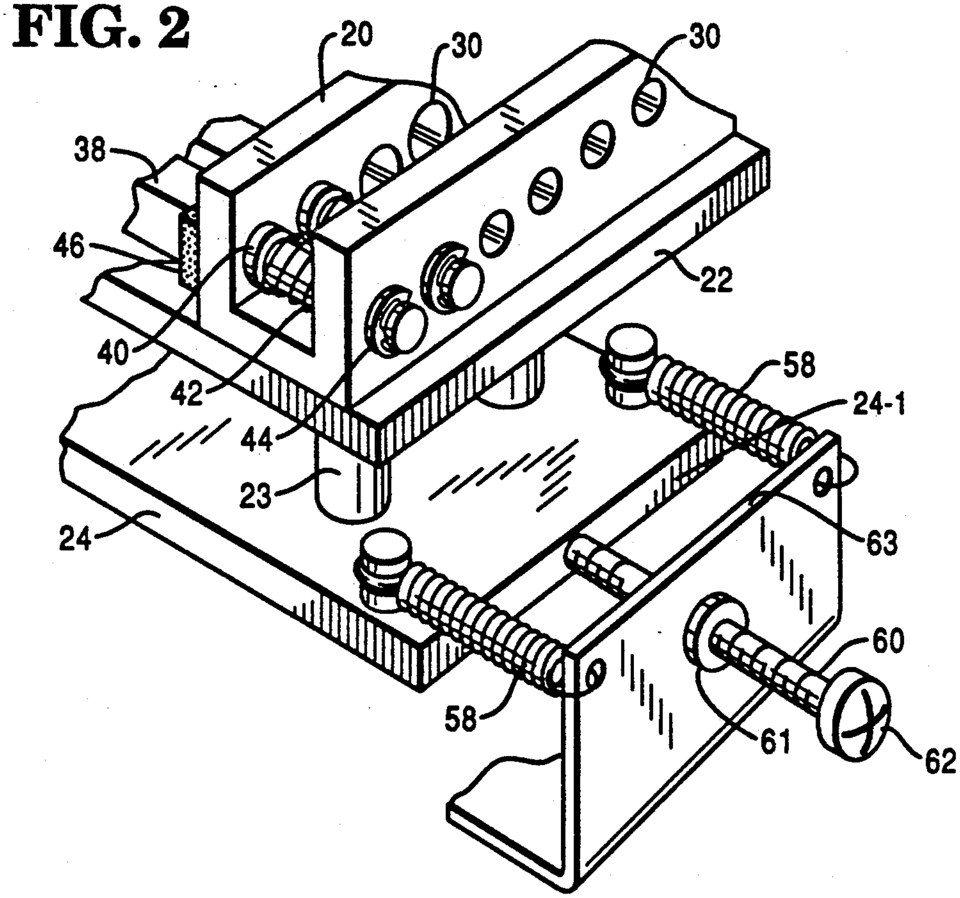
FIG. 2 is a fragmentary perspective view of the print head assembly having a manual adjusting mechanism.
Figure 3:
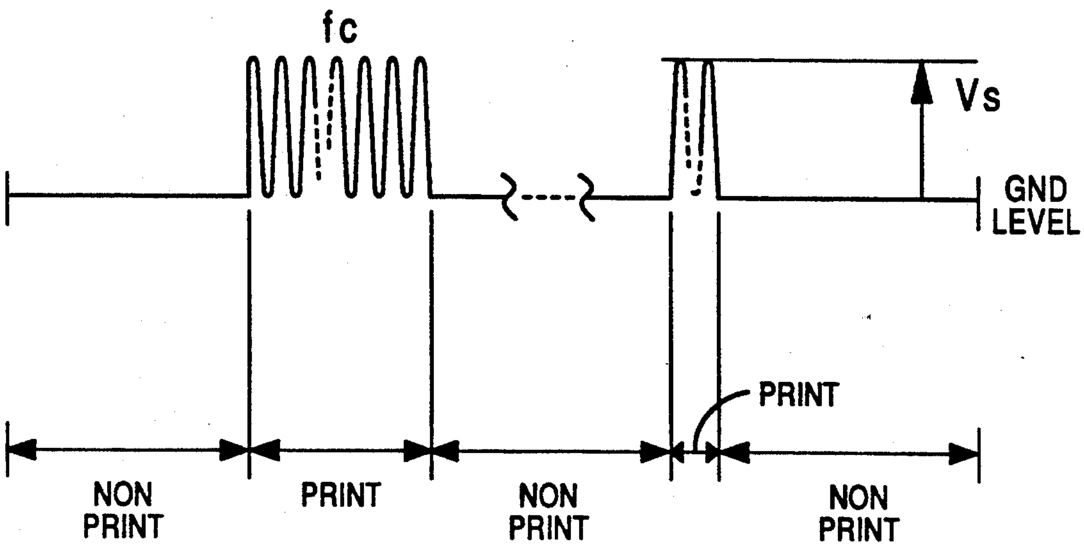
FIG. 3 PRIOR ART
FIG. 3 shows a timing diagram for an ultrasonic printer of the prior art.

Another embodiment of the present invention is illustrated in FIG. 2. In this embodiment, a manual actuator 60 having a knob 62 is threaded into a threaded sleeve 61 of a housing member 63 which is secured to the housing (not shown) of the ultrasonic printer (not shown). The manual actuator 60 may be used together with or in place of the stepping motor 54 and shaft 56 (FIG. 1). The manual actuator 60 provides a mechanism for manually adjusting the pressure with which the end 32-1 (FIG. 1) of each print head wire 32 forces the ink ribbon 52 into engagement with the print medium 34. The stepping motor 54 and the manual actuator 60 can be used in combination with each other to provide means for adjusting the force with which the end 32-1 of each print head wire 32 forces the ink ribbon 52 into engagement with the print medium 34.

The printing operation will be described next. When the carriage (not shown) is in a home position, illustrated in FIG. 1, the ribbon guide member 14-1 is spaced from the platen 33 by a distance of about 1 mm. As the carriage (not shown) starts to move in the direction of arrow B in FIG. 1, the stepping motor 54 may be energized by the control signal (not shown) from the controller (not shown) to cause the shaft 56 to engage the base plate 24 in order to move the end 32-1 of each print head wire 32 towards the platen 33. The stepping motor 54 causes the end 32-1 of each print head wire 32 to force the ink ribbon 52 against the print medium 34 and the platen 33. In the embodiment being described, the end 32-1 imparts a force on the ink ribbon 52 of about 30 grams. As the print medium 34 is forced into engagement with the platen 33, the coiled spring 42 on the compression shaft 40 becomes compressed. The coiled spring 42 permits the end 32-1 of each print head wire 32 to force the ink ribbon 52 against the print medium 34 and the platen 33 with a uniform force. While the ink ribbon 52 is sandwiched between the print medium 34 and the end 32-1, the controller (not shown) energizes the print head wires 32 for 0.5 milliseconds, for example, thereby causing the ink (not shown) in the ink ribbon 52 to melt onto the print medium 34 to form a pixel having a print contrast signal or PCS of 0.8. After a line of pixels has been printed, the stepping motor 54 is de-energized which causes the base plate 24 to move away from the print medium 34 under the force of the springs 58. In the above mentioned manner, the printing operation for one line of pixels can be accomplished across the print medium 34. The carriage (not shown) can be returned to the home position (shown in FIG. 1) whereupon the print medium 34 can be indexed in the direction of arrow C in FIG. 1 and another line of pixels can be printed onto the print medium 34. In this manner, a character (not shown) of data (not shown) formed by a plurality or matrix of pixels may be printed on the print medium 34.

Various changes or modifications in the invention described may occur to those skilled in the art without departing from the spirit or scope of the invention. For example, if a three-ply, carbonless paper is being used as the print medium 34, then the pressure which the end 32-1 exerts against the ink ribbon 52 and the print medium 34 could be adjusted to 40 grams by weight, thereby permitting pixels to be printed when the controller (not shown) energizes the vibrator 38 for 1.5 milliseconds. The above description of the invention is intended to be illustrative and not limiting, and it is not intended that the invention be restricted thereto but that it be limited only by the true spirit and scope of the appended claims.

What is claimed is:

1. A print head assembly for use in an ultrasonic printer, said ultrasonic printer having a platen, and an ink ribbon and a print medium operably associated with said platen, said print head assembly comprising:

plate support means for supporting said print head assembly;

a wire guide block and a print head guide block secured to said plate support means;

at least one print head slidably mounted in said print head guide block, said at least one print head having a print head wire secured thereto which is slidably mounted in said wire guide block, said at least one print head comprising:

an ultrasonic vibrator;

a horn coupled to said ultrasonic vibrator for amplifying energy generated by said ultrasonic vibrator;

said print head wire being coupled to said horn and having a tip which forces the ink ribbon into engagement with the print medium and against the platen in order to print a pixel on the print medium upon generation of energy by said ultrasonic vibrator; and a pressurizing mechanism located in said ultrasonic printer, said pressurizing mechanism engaging said plate support means to cause said tip of said print head wire to force the ink ribbon against the print medium and the platen with a predetermined force so that a pixel may be printed on the print medium when said ultrasonic vibrator is energized.

2. The print head assembly in accordance with claim 1, wherein said pressurizing mechanism includes a stepping motor having a shaft which contacts said plate support means.

3. The print head assembly in accordance with claim 1, wherein said pressurizing mechanism includes an adjustable screw having an end which contacts said plate support means.

4. The print head assembly in accordance with claim 1, wherein said horn is stepped.

5. The print head assembly in accordance with claim 1, wherein said horn has a shape which is defined by a Fourier Transform Series.

6. The print head assembly in accordance with claim 1, wherein said plate support means includes a compression block secured to said plate support means and having compression means operably associated with said ultrasonic vibrator of said at least one print head for biasing said at least one print head towards said print medium.

7. A printer having a printer station, said printer comprising:

a housing;

a controller for controlling said printer;

a carriage slidably mounted in said housing;

traversing means coupled to said controller for moving said carriage along the print station in said housing;

a platen mounted in said housing at the print station;

an ink ribbon and a print medium operably associated with said platen;

a first guide block and a second guide block located on said carriage;

at least one print head slidably mounted in said second guide block, said at least one print head having a print head wire secured thereto and slidably mounted in said first guide block, and said print head comprising:

an ultrasonic vibrator;

a horn coupled to the ultrasonic vibrator for amplifying energy generated by said ultrasonic vibrator;

said print head wire being coupled to said horn and having a tip which forces said ink ribbon into engagement with said print medium and against said platen in order to print a pixel on said print medium upon generation of energy by said ultrasonic vibrator; and a pressurizing mechanism located in said ultrasonic printer, said pressurizing mechanism engaging said carriage to cause said tip of each print head wire to force said ink ribbon against said print medium and said platen with a predetermined force so that a pixel may be printed on said print medium when said ultrasonic vibrator is energized.

8. The printer in accordance with claim 6, wherein said pressurizing mechanism includes a stepping motor having a shaft which contacts said carriage.

9. The printer in accordance with claim 6, wherein said pressurizing mechanism includes an adjustable screw having an end which contacts said carriage.

10. The printer in accordance with claim 6, wherein said horn is stepped.

11. The printer in accordance with claim 7, wherein said horn has a shape which is defined by a Fourier Transform Series.

12. The printer in accordance with claim 6, wherein said carriage includes a compression block secured to said carriage and having spring means operably associated with said ultrasonic vibrator of said at least one print head for biasing said at least one print head towards said ink ribbon and said print medium with a uniform force.

13. A print head assembly for use in the ultrasonic printer, said ultrasonic printer having a platen, and an ink ribbon and a print medium operably associated with said platen, said print head assembly comprising;

a housing plate;

a wire guide block extending upwardly from said housing plate, said wire guide block having at least one aperture extending therethrough;

at least one print head wire slidably mounted through said at least one aperture extending through said wire guide block;

vibrator means operably coupled with said at least one print head wire for vibrating said at least one print head wire;

a horn coupled to said vibrator means for amplifying energy generated by said vibrator means;

said at least one print head wire being coupled to said horn and having a tip which forces the ink ribbon into engagement with the print medium and against the platen to print a pixel on the print medium upon generation of energy by said vibration means; and a pressurizing mechanism engaged with said housing plate to cause said tip of said at least one print head wire to force the ink ribbon against the print medium and the platen with a predetermined force so that a pixel may be printed on the print medium when said vibrator means is energized.

14. The print head assembly in accordance with claim 13, wherein said vibrator means comprises an ultrasonic vibrator.

15. The print head assembly in accordance with claim 13, wherein said pressurizing mechanism includes a stepping motor having a shaft which contacts said housing plate.

16. The print head assembly in accordance with claim 15, wherein said horn is stepped.

17. The print head assembly in accordance with claim 15, wherein said horn has a shape which is defined by a Fourier Transform Series.

18. The print head assembly in accordance with claim 13, wherein said pressurizing mechanism includes an adjustable screw having an end which contacts said housing plate.

19. The print head assembly of claim 13, wherein said housing plate includes a compression block secured to said housing plate having compression means operably associated with said vibrator means of said at least one print head wire for biasing said at least one print head wire towards said print medium.

20. A printer having a printer station, said printer comprising:

a housing;

a controller for controlling said printer;

a print head assembly slidably mounted in relation to said housing;

a platen mounted in said housing at the print station;

an ink ribbon and a print medium operably associated with said platen;

a first guide block and a second guide block positioned on said print head assembly;

at least one print head slidably mounted in relation to said second guide block, said at least one print head having a print head wire secured thereto, said print head wire being slidably mounted in relation to said first guide block;

an ultrasonic vibrator operably coupled to said print head assembly;

a horn coupled to said ultrasonic vibrator for amplifying energy generated by said ultrasonic vibrator;

said print head wire being coupled to said horn and having a tip which forces said ink ribbon into engagement with said print medium and against said platen to print a pixel on said print medium upon generation of energy by said ultrasonic vibrator; and a pressurizing mechanism engaging said print head assembly to cause said tip of said print head wire to force said ink ribbon against said print medium and said platen with a predetermined force to print a pixel on said print medium when said ultrasonic vibrator is energized.

21. The printer in accordance with claim 20, wherein said pressurizing mechanism includes a stepping motor having a shaft which contacts said print head assembly.

22. The printer in accordance with claim 21, wherein said horn is stepped.

23. The printer in accordance with claim 21, wherein said horn has a shape which is defined by a Fourier Transform Series.

24. The printer in accordance with claim 20, wherein said pressurizing mechanism includes an adjustable screw having an end which contacts said print head assembly.

25. The printer in accordance with claim 20, wherein said print head assembly includes a compression block secured to said print head assembly having spring means operably associated with said ultrasonic vibrator of said at least one print head for biasing said at least one print head towards said ink ribbon and said print medium with a uniform force.

* * * * *

UNITED STATES PATENT AND TRADEMARK OFFICE

CERTIFICATE OF CORRECTION

PATENT NO. : 5,200,764

DATED : April 6, 1993

INVENTOR(S) : Hideo Nagasawa

It is certified that error appears in the above-identified patent and that said Letters Patent is hereby corrected as shown below:

Column 7, line 66, delete "6" and substitute --7--.

Column 8, line 1, delete "6" and substitute --7--.

Column 8, line 4, delete "6" and substitute --7--.

Column 8, line 9, delete "6" and substitute --7--.

Signed and Sealed this

Twenty-ninth Day of March, 1994

*Attest:*

BRUCE LEHMAN

*Attesting Officer*

*Commissioner of Patents and Trademarks*